(12) United States Patent
Lazarus et al.

(10) Patent No.: US 12,011,782 B2
(45) Date of Patent: Jun. 18, 2024

(54) METHOD AND APPARATUS FOR PERFORMING CONTACTLESS LASER FABRICATION AND PROPULSION OF FREELY MOVING STRUCTURES

(71) Applicant: U.S. Army DEVCOM Army Research Laboratory, Adelphi, MD (US)

(72) Inventors: Nathan S. Lazarus, Bear, DE (US); Gabriel L. Smith, Ellicott City, MD (US); Adam A. Wilson, Columbia, MD (US)

(73) Assignee: The Unied States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 18/114,679

(22) Filed: Feb. 27, 2023

(65) Prior Publication Data

US 2023/0201972 A1    Jun. 29, 2023

Related U.S. Application Data

(63) Continuation of application No. 16/662,951, filed on Oct. 24, 2019, now Pat. No. 11,602,806.

(60) Provisional application No. 62/812,057, filed on Feb. 28, 2019.

(51) Int. Cl.
*B23K 26/40* (2014.01)
*B23K 103/00* (2006.01)

(52) U.S. Cl.
CPC .......... *B23K 26/40* (2013.01); *B23K 2103/50* (2018.08)

(58) Field of Classification Search
CPC .... B23K 2103/50; B23K 26/38; B23K 26/40; B23K 103/00; C12Q 1/6827; C12Q 1/6886; C12Q 2600/106; C12Q 2600/156
See application file for complete search history.

(56) References Cited

U.S. PATENT DOCUMENTS

| | | | |
|---|---|---|---|
| 3,392,527 A | 7/1968 | Gilmour et al. | |
| 3,825,211 A | 7/1974 | Mimovitch | |
| 4,887,721 A | 12/1989 | Martin et al. | |
| 5,228,324 A | 7/1993 | Frackiewicz et al. | |
| 5,308,737 A | 5/1994 | Bills et al. | |
| 5,359,872 A | 11/1994 | Nashiki | |
| 5,712,463 A | 1/1998 | Singh et al. | |

(Continued)

FOREIGN PATENT DOCUMENTS

| | | | | |
|---|---|---|---|---|
| CN | 100398249 C | | 2/2008 | |
| CN | 100398249 C | * | 7/2008 | ......... B23K 26/0846 |
| DE | 10040978 A1 | * | 3/2002 | ........... B23K 26/067 |

OTHER PUBLICATIONS https://dl.asminternational.org/technical-books/monograph/124/chapter-abstract/2321916/Mechanical-Fastening?redirectedFrom=fulltext (Year: 2011).*

(Continued)

*Primary Examiner* — Dana Ross
*Assistant Examiner* — Adam M Eckardt
(74) *Attorney, Agent, or Firm* — Eric B. Compton

(57) ABSTRACT

A method and apparatus for using a laser to form and release an element of an actuator. The method comprising forming an actuator from sheet stock using a laser, where the actuator is three dimensional; releasing an element of the actuator from the sheet stock using the laser; and moving the released part relative to the sheet stock using laser ablation propulsion.

19 Claims, 9 Drawing Sheets

(56) References Cited

U.S. PATENT DOCUMENTS

| | | | |
|---|---|---|---|
| 5,719,374 | A | 2/1998 | Frackiewicz et al. |
| 6,011,239 | A | 1/2000 | Singh et al. |
| 6,251,328 | B1 | 6/2001 | Beyer et al. |
| 6,415,639 | B1 | 7/2002 | Killian et al. |
| 6,488,233 | B1 | 12/2002 | Myrabo |
| 6,530,212 | B1 | 3/2003 | Phipps et al. |
| 6,622,549 | B1 | 9/2003 | Jones et al. |
| 6,640,604 | B2 | 11/2003 | Matsushita |
| 6,933,098 | B2 | 8/2005 | Park et al. |
| 7,005,468 | B2 | 2/2006 | Zang et al. |
| 7,476,557 | B2 | 1/2009 | Daniels et al. |
| 8,113,248 | B2 | 2/2012 | Lee et al. |
| 8,192,545 | B2 | 6/2012 | Hiura et al. |
| 8,435,373 | B2 | 5/2013 | Slafer |
| 8,601,680 | B2 | 12/2013 | Choi et al. |
| 8,828,116 | B2 * | 9/2014 | Fuwa .................. C22C 38/14 420/95 |
| 8,980,380 | B2 | 3/2015 | Pique et al. |
| 10,342,119 | B1 * | 7/2019 | Mujcinovic .......... H05K 5/0004 |
| 11,602,806 | B2 | 3/2023 | Lazarus et al. |
| 2002/0021480 | A1 | 2/2002 | Auracher et al. |
| 2002/0184936 | A1 * | 12/2002 | Gitlin .................. B21D 5/00 72/379.2 |
| 2016/0016255 | A1 | 1/2016 | Bruck et al. |
| 2016/0046132 | A1 | 2/2016 | Tokushima et al. |
| 2018/0222604 | A1 * | 8/2018 | Garus .................... B64G 1/646 |
| 2019/0188346 | A1 | 6/2019 | Mirabella et al. |

OTHER PUBLICATIONS

Bennett et al., "Infrared Reflectance And Emittance Of Silver And Gold Evaporated In Ultrahigh Vacuum", Applied Optics, vol. 4, No. 2, pp. 221-224, published date Feb. 1965. Miehekoa Laboratory, China Lake, California.

Miura, "Method of Packaging and Deployment of Large Membranes in Space", The Institute of Space and Astronautical Science Report No. 618, Dec. 1985.

Datskos et al., "Photoinduced and thermal stress in silicon microcantilevers", Applied Physics Letters vol. 73, No. 16, published American Institute of Physics, date Oct. 19, 1998.

Amoruso et al. "Characterization of laser-ablation plasmas", Topical Review, Journal of Physics. B, Atomic, Molecular and Optical Physics 32 (1999) R131-R172, IOP Publishing Ltd, Printed in the UK.

Sulfridge et al., "Optical Actuation of a Bistable MEMS", Journal of Microelectromechanical Systems, vol. 11, No. 5, Oct. 2002.

Gonzales et al., "Micropropulsion using a Nd:YAG microchip laser", Proceedings Of Spie, High-Power Laser Ablation IV, Claude R. Phipps, Editor, Proceedings of SPIE vol. 4760 pp. 752-765, (2002).

Hu et al., "Experimental and Numerical Modeling of Buckling Instability of Laser Sheet Forming", International Journal of Machine Tools & Manufacture 42 (2002) 1427-1439, Elsevier Science Ltd.

Dearden et al., "Some recent developments in two- and three-dimensional laser forming for 'macro' and 'micro' applications", Review article: 2D and 3D laser forming, Journal Of Optics A: Pure And Applied Optics, 5 (2003) S8-S15, Institute Of Physics Publishing (IOP), Uk published Jun. 25, 2003.

Pakhomov et al., "Ablative Laser Propulsion A Study of Specific Impulse Thrust and Efficiency", AIP Conference Proceedings 664, 194 (2003), Published by the American Institute of Physics.

Nebolsine et al., "Laser Propulsion The Early Years", AIP Conference Proceedings 664, 11 (2003); doi: 10.1063/1.1582092, Published by the American Institute of Phys'A Study into the 2D and 3D Laser Forming of Metallic Components ics.

Edwardson, "A Studyinto the 2D and 3D Laser Forming of Mettalic Components" PHD Thesis The University of Liverpool—Department of Engineering, Mar. 2004, Chapter 2: Literature Review.

Small et al."Laser-Activated Shape Memory Polymer Microactuator for Thrompus Removal Following Ischemic Stroke Preliminary In Vitro Analysis", IEEE Journal of Selected Topics in Quantum Electronics, published Nov. 1, 2004.

Bell et al., "MEMS actuators and sensors: observations on their performance and selection for purpose", Journal of Micromechanics and Microengineering, 15 (2005) S153-S164, Institute of Physics Publishing (IOP), published date Jun. 20, 2005.

Zheng et al., "Characteristic Investigation of Ablative Laser Propulsion Driven by Nanosecond Laser Pulses", Applied Physics A 83, 329-332 (2006), published online: Feb. 11, 2006.

Shi et al., "Temperature Gradient Mechanism in Laser Forming of Thin Plates", Optics & Laser Technology 39 (2007) 858-863, available online Mar. 29, 2006.

Dyachenko, "Studies On Laser Ablation Of Polymer Coated Propellant Films", A Thesis Submitted to The Graduate Faculty of Auburn University, Alabama, date Aug. 7, 2006.

Kuribayashi et al., "Self-Depolyable Origami Stent Grafts as a Biomedical Application of Ni-rich TiNi Shape Memory Alloy Foil", Materials Science and Engineering A 419 (2006) 131-137.

Shen et al., "Modelling of Laser Forming an Review", Computational Materials Science 46 (2009) 834-840, available online May 12, 2009.

Wu et al., "Laser Bending of Brittle Materials", Optics and Lasers in Engineering 48 (2010) 405-410, Available online Dec. 11, 2009.

Birnbaum et al., "The Effects of Laser Forming on NiTi Superelastic Shape Memory Alloys", Journal of Manufacturing Science and Engineering (ASME), Transactions of the ASME, vol. 132 / 041002-1, Aug. 2010.

Phipps et al., "Review Laser Ablation Propulsion", Journal of Propulsion and Power, vol. 26, No. 4, Jul.-Aug. 2010.

Hayek, "Using a High Repetition Rate Nd:YAG Laser For Pulsed Laser Ablation Propulsion", A thesis presented to Ryerson University, Toronto, Ontario, Canada, 2010, Chapter 3 (Fundamentals of Laser Ablation Propulsion), pp. 22 to 34.

Whitney et al., "Pop Up Book MEMS", Journal of Micromechanics and Microengineering 21 (2011) 115021 (7pp), IOP Publishing Published Oct. 14, 2011.

Guizzo et al., "Robotics Trends for 2012", The Future Is Robots, Mar. 2012, IEEE Robotics & Automation Magazine, pp. 119-123, date of publication: Mar. 26, 2012.

Griffiths et al., "Thermal Laser Micro Adjustment using Picosecond Pulse Durations", Applied Surface Science 258 (2012) pp. 7639-7643, available online date Apr. 21, 2012.

Dougherty, "The Maker Movement", Innovations vol. 7, No. 3, pp. 11-14, Making In America, 2012.

Mueller et al., "Laser Origami Laser Cutting of 3D Objects", Session: Fabrication CHI 2013: Changing Perspectives, Paris, France, Apr. 27-May 2, 2013,pp. 2585-2592.

Jiang et al., "The Bending Forming Mechanism of Copper Alloy by Different Lasers", Advanced Materials Research Online: Jun. 19, 2014 ISSN: 1662-8985, vol. 968, pp. 142-145, Online: Jun. 19, 2014. Trans Tech Publications, Adelphi, USA.

Evans et al., "Laser Actuation of Cantilevers for Picometre Amplitude Dynamic Force Microscopy", Scientific Reports 4 : 5567, published date Jul. 4, 2014.

Halverson et al.,"Maker Movement in Education", Harvard Educational Review vol. 84 No. 4 pp. 495-504, Winter 2014, Harvard Education Publishing Group, Cambridge, MA.

Barrett et al. "A Review of University Maker Spaces", 122nd ASEE Annual Conference & Exposition Jun. 14-17, 2015, Seattle, Washington, 2015.

Kolesar, "A Study of Laser Ablation Propulsion Using Polyoxymethelyene and a High Power Diode Laser", San Jose State University, Dec. 2015.

Liu et al., "Reversible and Rapid Laser Actuation of Liquid Crystalline Elastomer Micropillars with Inclusion of Gold Nanoparticle", Advanced Functional Materials 2015, 25, 3022-3032, WILEY-VCH Verlag Gmbh & Co. KGaA, Weinheim.

Rogers et al., "Origami MEMS and NEMS", MRS Bulletin • vol. 41 Feb. 2016.

Skandani et al., "Discrete State Photomechanical Actuators", Extreme Mechanics Letters 9 (2016) 45-54, available online May 14, 2016.

Gao et al.,"Development of Scan Strategies for Controlled 3D Laser Forming of Sheet Metal Components", 9th International Conference

(56) References Cited

OTHER PUBLICATIONS on Photonic Technologies—LANE 2016, Physics Procedia 83 ( 2016 ) 286-295, ScienceDirect, Elsevier, Aug. 27, 2016.
Zhang et al., "Origami and Kirigami Inspired Self Folding for Programming Three Dimensional Shape Shifting of Polymer Sheets with Light", Extreme Mechanics Letters 11 (2017) 111-120, available online Aug. 31, 2016.
Lazarus et al., "Laser Forming for Complex 3D Folding", Advance Material Technologies 2017, 1700109 WILEY-VCH Verlag Gmbh & Co. KGaA, Weinheim.
Thakoor et al., "Optical Microactuation in Piezoceramics", 1998.
A. Gisario, M. Mehrpouya, S. Venettacci, A. Mohammadzadeh, and M. Barletta, "LaserOrigami (LO) of three dimensional (3D) components: Experimental analysis and numerical modelling," J. Manufacturing Processes, vol. 23, 2016, pp. 242-248.
J. D. Majumdar and I. Manna, "Laser material processing," Int. Materials Reviews, 2011, vol. 56, pp. 341-388.
M. Nunobiki, K. Okuda, K. Hourai and H. Shizuka, "Bending of pure titanium sheet to curved surface shape by laser forming technique," Adv. Mater. Research, vol. 126-128, 2010 pp. 388-393.
G. Thomson and M. S. Pridham, "Controlled laser forming for rapid prototyping," Rapid Prototyping Journal, vol. 3, 1997, pp. 137-143.
J. Magee and L. J. deVin, "Process planning for laser-assisted forming," J. Materials Processing Technology, vol. 120, 2002, pp. 322-326.
K. Jain et al., "Flexible Electronics and Displays: High-Resolution, Roll-to-Roll, Projection Lithography and Photoablation Processing Technologies for High-Throughput Production", Proceedings of the IEEE, vol. 93, No. 8, Aug. 2005, pp. 1500-1510.
R. Sondergaard et al., "Roll-to-roll fabrication of polymer solar cells", Materialstoday, vol. 15, No. 1-2, Jan.-Feb. 2012, pp. 36-49.
J. Yeo et al., "Flexible supercapacitor fabrication by room temperature rapid laser processing of roll-to-roll printed metal nanoparticle ink for wearable electronics application", Journal of Power Sources, 246, 2014, pp. 562-568.
T.R. Anderson et al., "Scalable, ambient atmosphere roll-to-roll manufacture of encapsulated large area, flexible organic tandem solar cell modules", Energy & Environmental Science, vol. 7, No. 9, Sep. 2014, pp. 2925-2933.
U.S. Appl. No. 16/059,591, filed Aug. 9, 2018, titled "Complex Laser Folding and Fabrication."
Non-Final Office Action issued for U.S. Appl. No. 16/059,591 dated Mar. 31, 2021.
Non-Final Office Action issued for U.S. Appl. No. 16/059,591 dated Oct. 21, 2021.
"Laser Assisted Forming for Ship Building" by G. Dearden and S. P. Edwardson, of the University of Liverpool, presented at the Shipyard Applications for Industrial Lasers Forum (SAIL), Williamsburg, Va., Jun. 2-4, 2003.
http:/web.archive.org/web/20160202033244/https://www.galco.com/comp/moto-ac.htm (Year: 2016).

\* cited by examiner

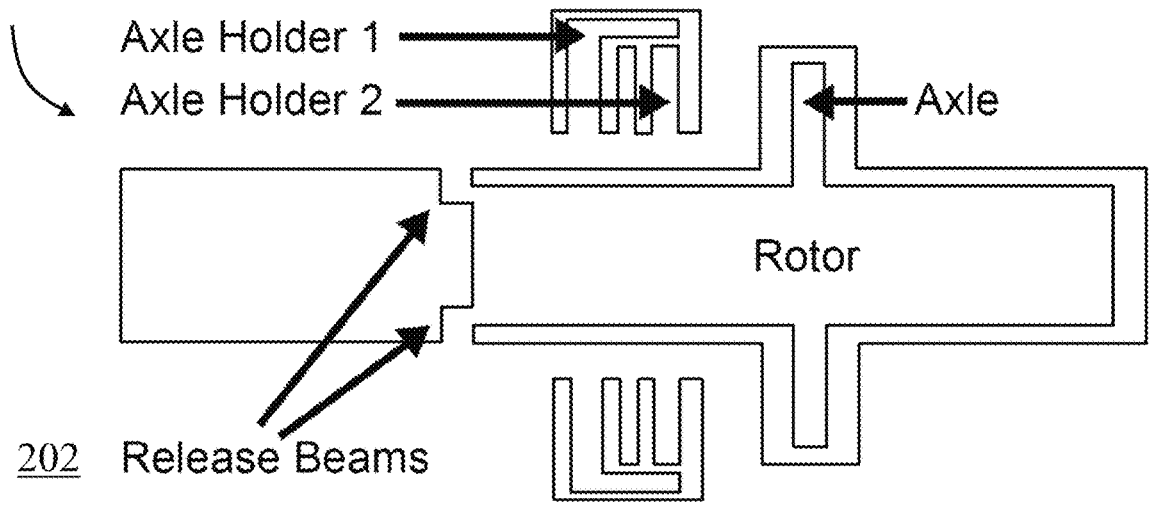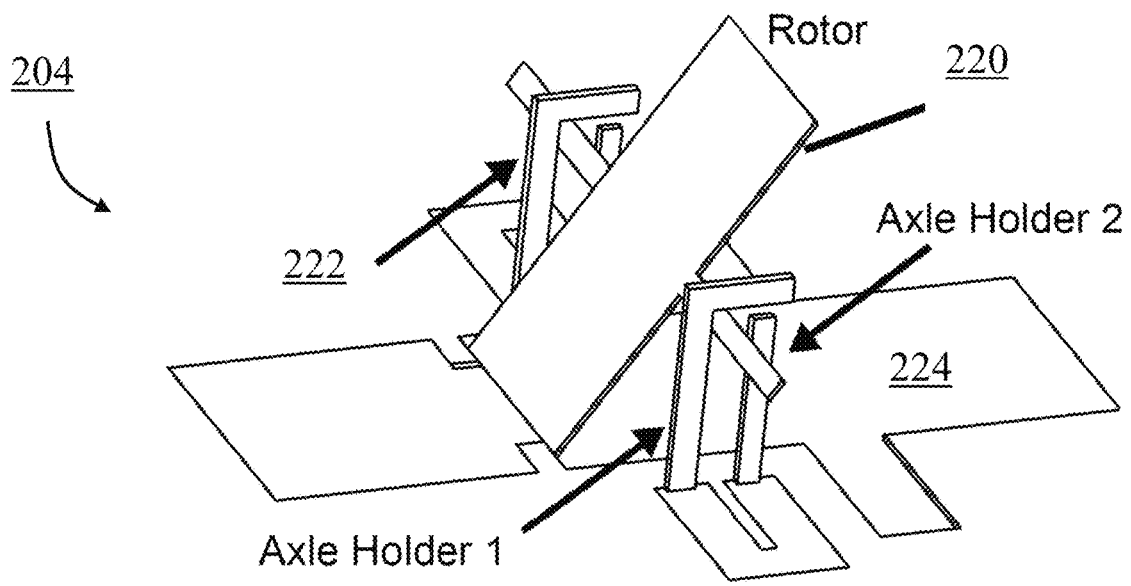
FIG. 2

METHOD AND APPARATUS FOR PERFORMING CONTACTLESS LASER FABRICATION AND PROPULSION OF FREELY MOVING STRUCTURES

RELATED APPLICATION(S)

This application is a continuation of U.S. patent application Ser. No. 16/662,951 filed on Oct. 24, 2019, which in turn, claims benefit to U.S. Provisional Patent Application Ser. No. 62/812,057, filed Feb. 28, 2019, entitled "Use of a Laser for Release and Propulsion in a Self-Folding Manufacturing Process," each of which is hereby incorporated herein in its entirety for all purposes.

Also, this application contains material that is related to commonly assigned U.S. patent application Ser. No. 16/059,591, filed Aug. 9, 2018, entitled "Complex Laser Folding and Fabrication," which is hereby incorporated herein in its entirety.

GOVERNMENT INTEREST

The invention described herein may be manufactured, used and licensed by or for the U.S. Government.

BACKGROUND

Field of the Invention

Embodiments of the present invention generally relate to a laser fabrication of structures and, more specifically, a method and apparatus for performing contactless laser fabrication of structures and propulsion of freely moving structures.

Description of the Related Art

Even though many practical systems are fundamentally 3D, most fabrication processes are far less expensive when operating in two dimensions. An important case in point is the laser cutter, widespread throughout machine shops and universities, which is generally used to cut exclusively in a 2D plane to avoid the need for complex motor/gantry systems needed to project onto a three-dimensional object. Engineers have long drawn inspiration from origami principles to fold 2D objects more easily fabricated into complex 3D shapes. In U.S. patent application Ser. No. 16/059,591, cited above, there is described a technique for remotely cutting and folding parts using a technique known as "laser forming," where plastic strains are generated to fold a part using controlled heating by the laser.

FIG. 1 shows a few example parts 102, 104, 106, 108, 110, 112 (with TGM and BM referring to temperature gradient and buckling mechanisms used for up and down folds respectively, which are explained in more detail in the '591 patent application). Specifically, FIG. 1 depicts a plurality of structures fabricated using a background art technique of laser cutting and folding, including (a) Raised logo 102 (single temperature gradient mechanism (TGM) fold), (b) cube 104 (multiple TGM folds), (c) airplane 106 (multiple TGM and buckling mechanism (BM) folds), (d) TGM two turn coil 108 (e) TGM cylinder 110 (continuous upward bending), (f) BM arc 112 (continuous downward bending) after removal from laser and flipping.

One limitation, for all self-folded techniques, is that there is no demonstrated mechanism to create suspended, freely moving parts using the self-folding technique without additional handling. Creating a single, solid part is useful in its own right, but many, many applications require multiple distinct components with internal motion within the part (switches, latches, gates, motors, generators, etc.).

Laser ablation propulsion is known, but predominantly in the limited context of propulsion of small satellites for space application. Use for positioning and propelling a released component in a remotely self-folded manufacturing process has heretofore not be performed. There is a need in the art for techniques for performing a final release cut using the laser, and moving the resulting released components using laser ablation propulsion.

SUMMARY

Embodiments of the present invention generally include a method and apparatus for using a laser to form and release an element of an actuator. The method and apparatus forms an actuator from sheet stock using a laser, where the actuator is three dimensional; and releases an element of the actuator from the sheet stock using the laser.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 2 depicts two stages in a process for fabricating an actuator in accordance with an embodiment of the invention.

DETAILED DESCRIPTION

Embodiments of the present invention create structures that are not only self-folded but are released and positioned to form a resulting self-folded product/system. Such a technique embodied in a method and apparatus allows remote folding and assembly of complex multi-component parts not currently possible with any other self-folding technique.

Figure 1:
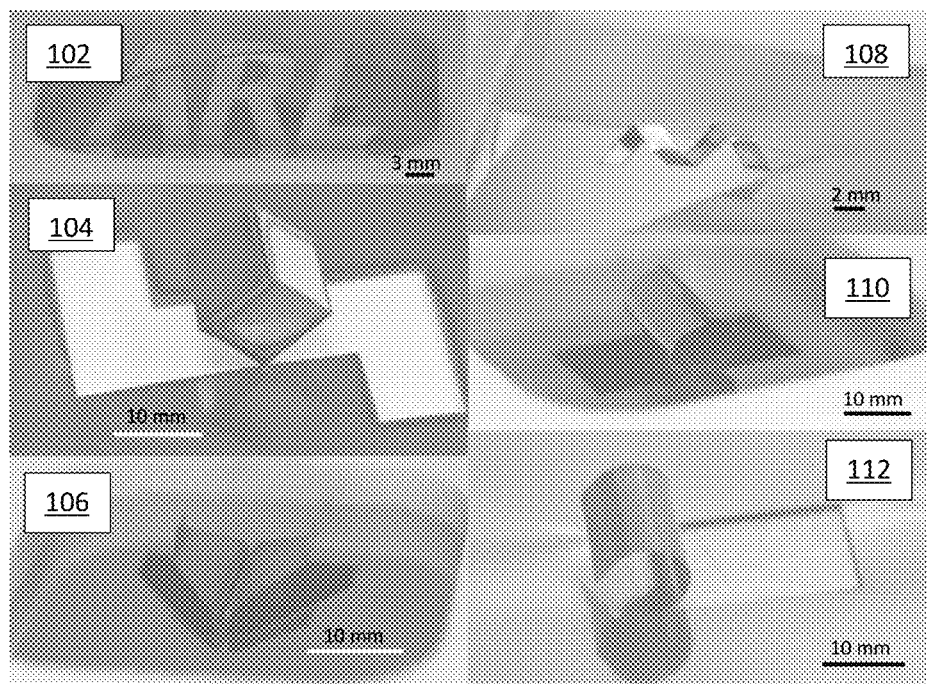
FIG. 1 depicts a plurality of structures fabricated using a background art technique of laser cutting and folding.
Figure 2A:
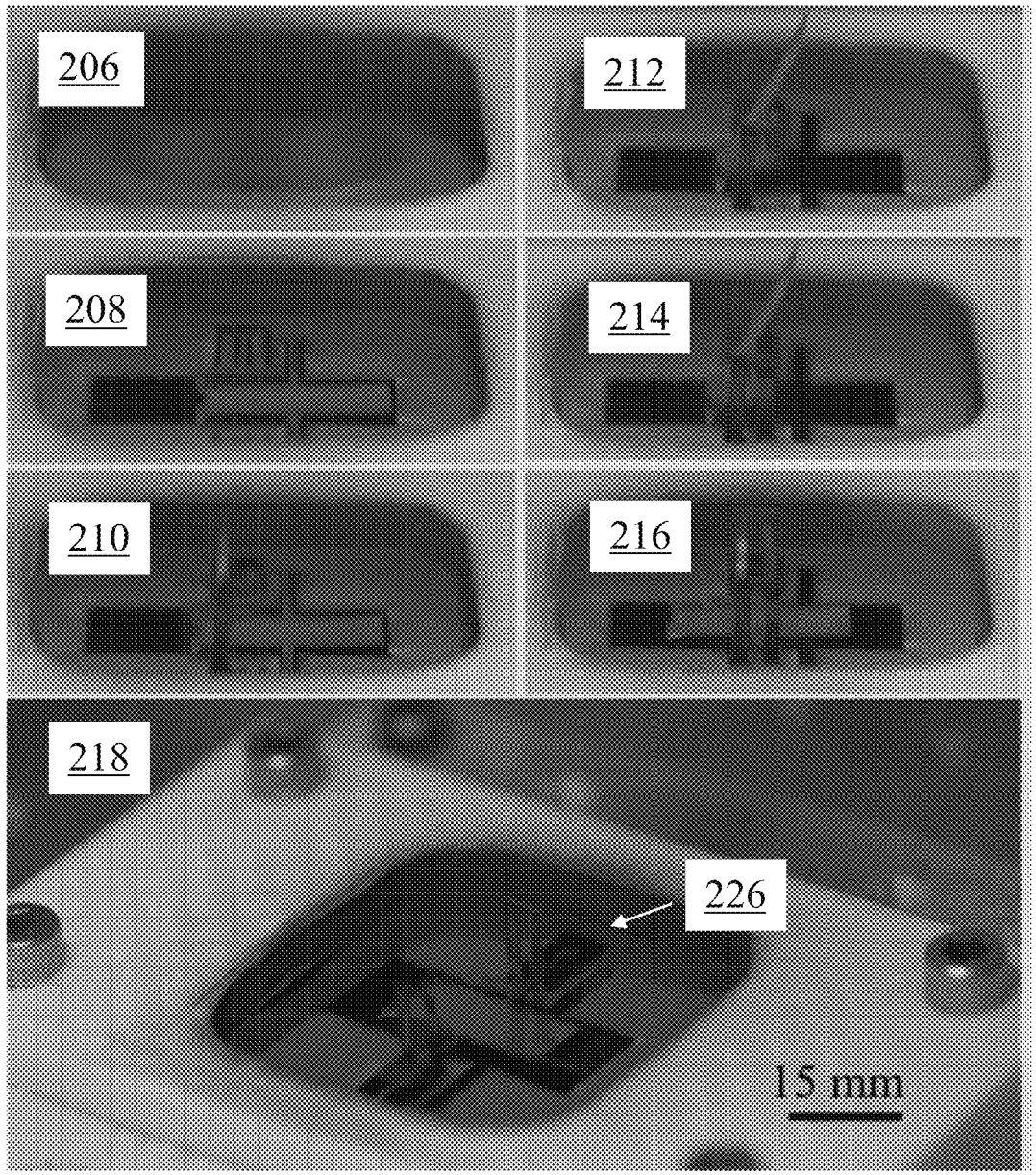
FIG. 2A includes a plurality of images showing a detailed sequence in an actual process.

FIG. 2 depicts two exemplary stages in the fabrication process 200 of an actuator 226 having freely rotating rotor element 220. It depicts a workpiece 202 after outline cut, and at 204 the workpiece is depicted after assembly into an actuator 226 but before final release of the rotor 220. FIG.

2A includes a plurality of images showing a detailed sequence in an actual process.

Beginning with a blank piece of metal foil as shown in image 206, an outline of both the rotor element 220 and axle holders 222, 224 are first cut using a raster pattern of the laser at full power (20 W) and 100 mm/s travel speed. In one embodiment, the foil may be nickel. However, laser folding of materials that can lead to creation of an actuator may be performed on ceramics, crystalline semiconductors or glass. Other metals that may be used as the metal foil include, but are not limited to, stainless steel, bronze, brass, copper, NiTi shape memory alloy or combinations thereof.

A larger hole was also cut (on the left side of workpiece 202) to create space for the rotor to move. Upward bending in the process is performed using slower, low power scans (e.g., 5 W, 30 mm/s laser travel speed). First, the front of the axle holders are folded up out of plane (image 210); these hook structures are designed to set the maximum fold of the rotor element. The fold angle of the axle holder is set to due to a self-limiting behavior of the laser forming. Since the laser is coming approximately vertically down from directly above the part, the laser is blocked when the folded metal reaches vertical. While a stopper is used to set the arbitrary angle of the fold of the rotor element, the fold angle can also be controlled using the number of laser scans across the fold line, as characterized in U.S. patent application Ser. No. 16/059,591 cited above. The rotor is then folded until it makes contact with the axle holder (image 212), followed by folding of the second portion of the axle holders (image 214), a straight beam intended to contain the rotor and prevent it from falling out of the holder during release. At this stage, the structure is released by cutting two short beams (release beams) at the base of the rotor element and allowing the rotor to fall into place (image 210). Image 218 shows a perspective view of the completed actuator assembly 226.

Next, the released component is moved, again only using the laser itself. When particles leave the surface during laser cutting, a reaction force is experienced on the part which can be used for motion—this is a technique known as laser ablation propulsion. Laser ablation propulsion has a particularly high specific impulse potential, or impulse per weight of propellant, which is used within the manufacturing process to allow released parts to be moved, for the purposes of assembly, latching/switching and moving parts around the build plate upon which an assembly is created.

Figure 3:
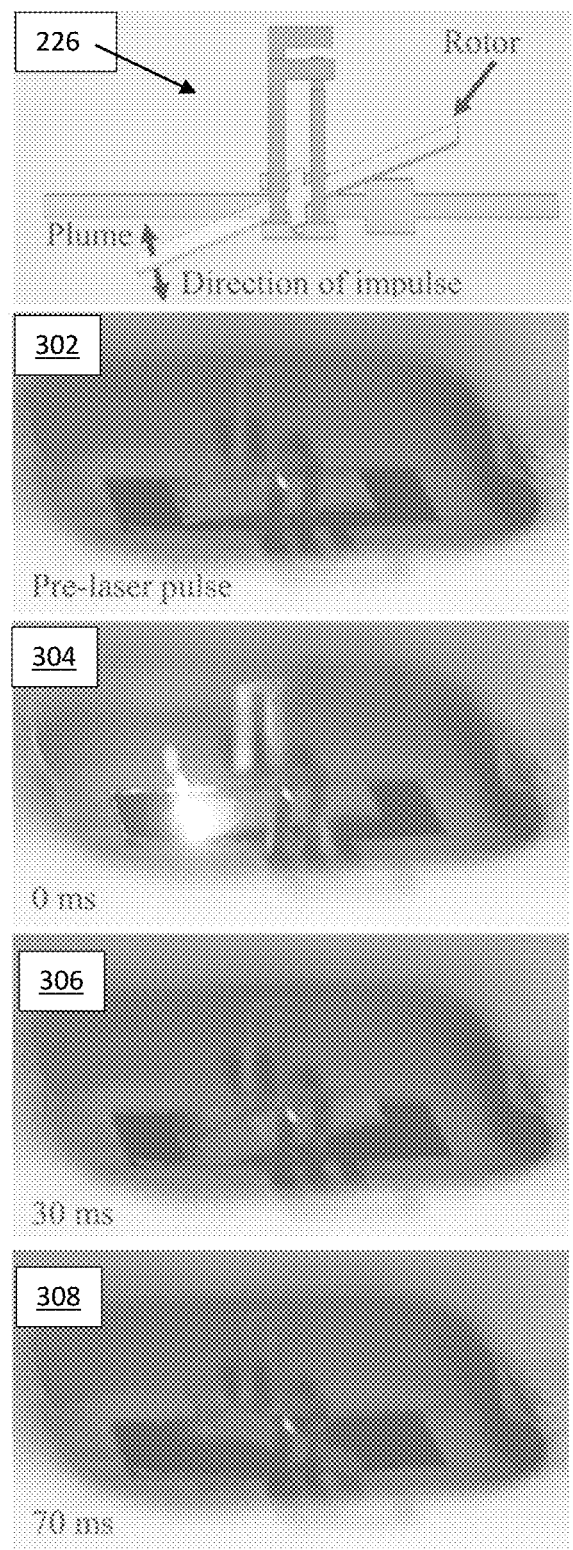
FIG. 3 contains images of the actuator indicating a direction of the laser impulse and the resulting plume used for laser ablation propulsion.

FIG. 3 illustrates the rotor 220 of the actuator 226 of FIG. 2 being actuated with a laser scan of an approximately 2 mm long line at 100 mm/s and 20 W power level, corresponding to an impulse of roughly 2.6 N s based on the pendulum characterization. The rotor 220 is clearly released, and large deflections are possible using laser ablation, moving, in the depicted experiment, about 4 mm down for the impulse. As shown in images 304, 306 and 308. While this form of propulsion does use a small amount of the rotor material (in this embodiment, nickel) during every ablation cycle, a sufficient amount of material remains so that the rotor can be actuated repeatedly without shifting the laser scan location.

Image 304 illustrates the actuator having the rotor impacted by a laser in the downward direction, while a plume of material is ejected from the rotor in the opposite direction from the laser direction. The plume causes the rotor to rotate. Laser ablation propulsion works by exposing a region until it hits what is known as the ablation threshold where material is ejected, and it is this ejection of material in a heated plume that generates the resulting force on the part.

Images 304, 306 and 308 show the rotor being impacted and moving. Specifically, image 302 shows the actuator prior to exposure to the laser. Image 304 shows the actuator at the time the laser impacts the rotor. Images 306 and 308 show the actuator 30 mS and 70 mS, respectively, after laser impact. Note the significant movement of the rotor.

Figure 4:
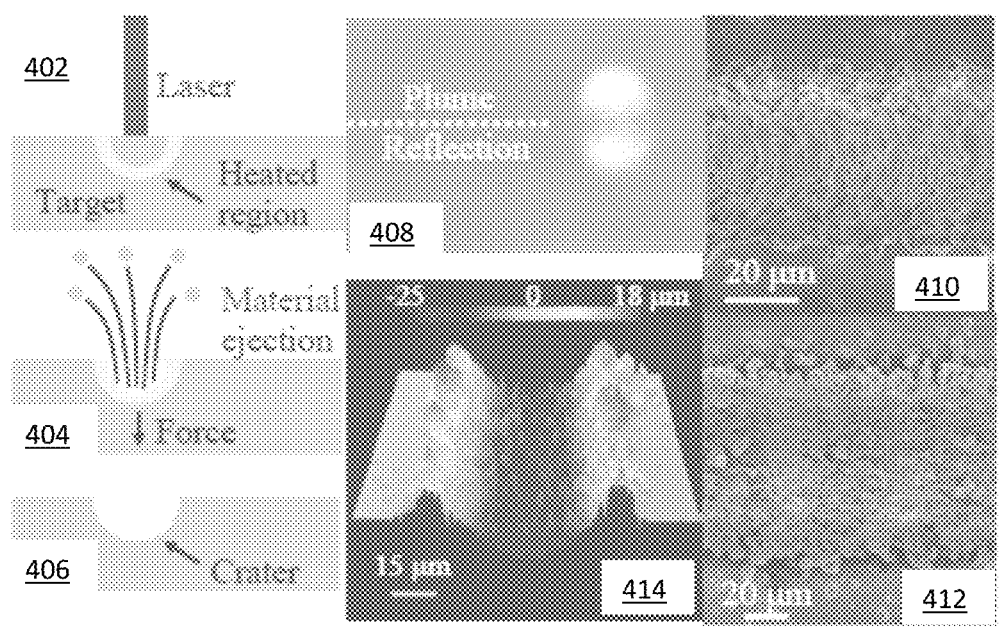
FIG. 4 depicts the process of laser ablation and images of the ablation plume and the resulting ablated metal.

As a laser scans across the surface of a target, localized heating occurs (FIG. 4 at image 402). When the absorbed energy reaches a level known as the fluence threshold, material is ablated from the surface. This ejection of material, typically in the form of an expanding plasma plume, results in a reaction force in the opposite direction (FIG. 4 at image 404). Some of the surface layer is removed during the ablation process, leaving behind a small crater (FIG. 4 at image 406). Laser ablation can be used on a broad range of materials including various metals, semiconductors, and insulators, as well as polymers. Since laser ablation propulsion relies on the use of the target itself as fuel, the proposed technique here is most suitable as part of the manufacturing and assembly process rather than for long term use.

The laser cutter in this embodiment of the invention was a commercial solid-state pulsed fiber marking laser (MC Series, Full Spectrum Laser) with wavelength 1064 nm, maximum power 20 W and spot size approximately 80 µm. The laser has been used to cut up to 1 mm thickness of material at a single focus z-position with this laser, but for consistency with the technique disclosed in U.S. patent application Ser. No. 16/059,591 cited above, in this embodiment, an 80 µm thick high purity (99.99%) nickel foil was used as a target. FIG. 4 at image 408 shows the ablation plume on the nickel surface as the laser was scanned at 100 mm/s at the 20 W power setting, imaged using a Keyence VW-6000C high speed microscope. Since the laser is scanning across the surface, causing a steady quantity of material to be ejected, the plume reaches an approximate steady state after approximately 150 µs and the plume is imaged in FIG. 4 at image 408 at this point in time. Laser ablation in non-vacuum conditions forms a mushroom-cloud-like plume due to combustion with the air as seen in FIG. 4 at image 408.

The laser tracks left by scans at 100 mm/s at two different powers, 5 W and 20 W, are shown in FIG. 4 at images 410 and 412, respectively. For the lower power laser scan, the ablation is less aggressive, and a pattern of ridge-like features is evident along the length of the track. These correspond to the overlap between individual laser pulses as the pulsed fiber laser is pulsed at its defined setting of 20 kHz. During the laser heating, molten metal is driven toward the edges of the heated region resulting in re-deposition of material along the edges of the crater, clearly evident in the SEM at the higher power setting as well as in the corresponding height profile (FIG. 4 at image 414) taken on the resulting crater with an Olympus LEXT OLS 4000 laser confocal microscope. The laser ablation scan at 20 W created a track with maximum depth approximately 25 µm and 85 µm in width, with edge features a maximum 18 µm tall, compared with depth, width, and edge height approximately 5 µm, 50 µm, and 5 µm respectively for the 5 W scan. While this is a significant depth of cut (desirable for cutting purposes, with repeated laser scans used to rapidly cut all the way through the foil), for propulsion much of the material remains on the surface in the edge features, available for further actuation.

Figure 5:
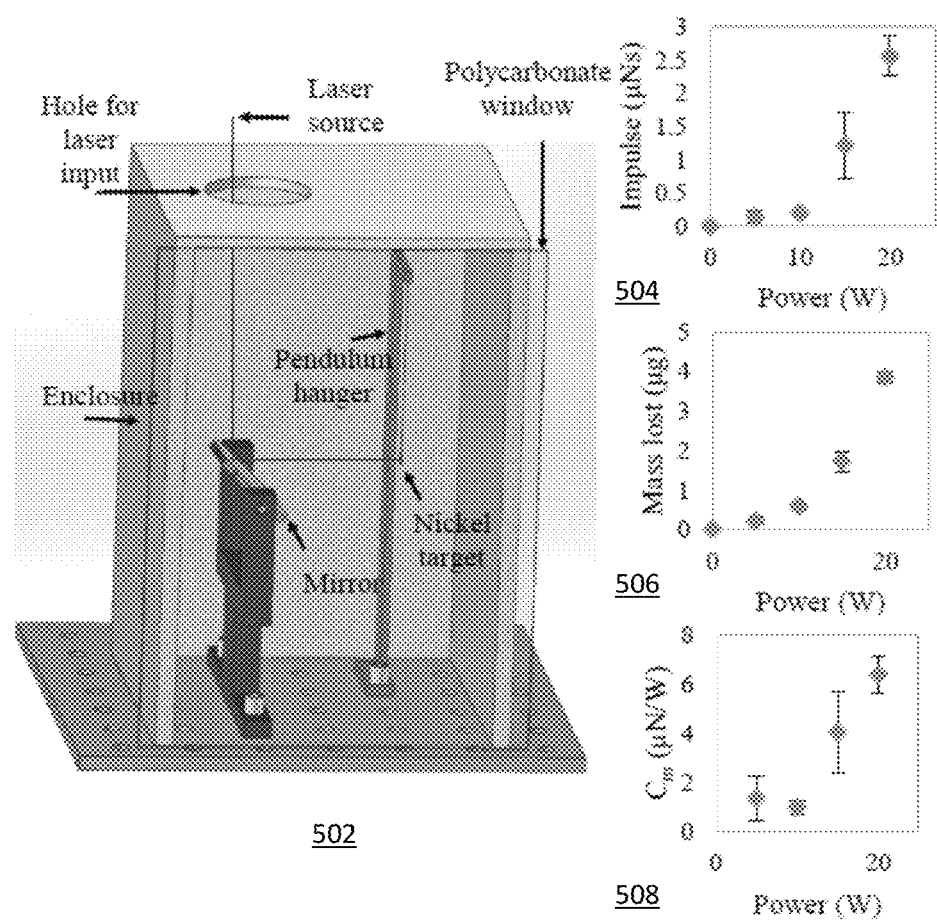
FIG. 5 diagram of pendulum test setup for measuring the force generated by laser ablation.

When material is ablated from the surface, the reaction force, or thrust T, generated is equal to the mass flow rate of ablated material times its velocity:

$$T = \frac{dm}{dt} v_{exhuast} \quad (1)$$

where m is the mass and $v_{exhaust}$ the propellant velocity. To characterize the force from the marking laser, a test setup 502 was built as depicted in FIG. 5. A target is suspended on a thin filament or thread to form a pendulum. When mass is ablated, the resulting thrust causes motion of the pendulum. The impulse I, or change in momentum, can be found by integrating the thrust T over the period in which it acts. With momentum equal to mass times velocity, the initial kinetic energy of the target is expressed by:

$$KE = \frac{1}{2} m_{target} v_0^2 = \frac{1}{2} \frac{I^2}{m_{target}} \quad (2)$$

where $m_{target}$ m is the mass of the target and $v_0$ its initial velocity.

The displacement of the pendulum can then be used to determine the initial impulse on the target since the initial kinetic energy must be equal to the maximum potential energy of the pendulum. If the target has significantly more mass than the thread, allowing approximation as a simple point mass, the impulse is:

$$I = \sqrt{2ghm^2_{target}} \quad (3)$$

with g the gravitational acceleration and h the height of the mass at the end of its swing.

FIG. 5 contains a diagram of the setup 502. A 3D printed hanger was used to suspend a pendulum consisting of a laser-cut piece of nickel foil serving as a target (lateral dimensions 5 mm by 5 mm, thickness ~75 μm) attached to a 64 mm long piece of white sewing thread 70 μm in diameter. For pendulum testing, the laser beam must project horizontally onto the target to apply the impulse. As with many laser cutters, the laser cutter used in this work is designed to project vertically down onto a cutting surface. A polished gold mirror (ThorLabs PF10-03-M01) was used to reflect the laser, with gold expected to have a reflectance of approximately 99% for the wavelength of the laser. Due to the small mass of the target and thread, air currents within the laser cutter generated by the internal fan resulted in a tendency to sway, limiting the ability to focus the laser on the target. A 3D printed enclosure was therefore built consisting of a 3D printed frame with a hole in the top above the mirror for the laser input. To allow imaging for displacement measurement, a transparent sheet of polycarbonate was used for the front of the enclosure.

Graph 504 in FIG. 5 shows the measured impulse for different power levels measured using the pendulum setup 502. The marking laser input consisted of a 2 mm long line with the laser travelling at a speed of 100 mm/s, giving a time interval of 20 ms. Three samples were measured for each setting, with the value and error bars corresponding to the average and standard deviation respectively. The resulting impulse was extracted from the displacement measured using 60 Hz video taken with a Canon EOS 6D digital camera imaging through the polycarbonate window. The mass lost in an individual cut line was small and difficult to resolve on the scale used here (Mettler Toledo XP26, resolution 1 μg). As a result, a larger number of identical lines was patterned on a larger blank sheet of the nickel foil, with the resulting total mass loss (measured by weighing the sample before and after cutting) then used to estimate an average loss per individual cut line. Specifically, the mass lost in each case was estimated by cutting a hundred 2 mm long lines at each power setting onto a test piece approximately 2 cm on a side and measuring the total mass lost. Graph 506 shows the estimated mass ablated for each individual line, with three samples again measured for each power level.

One of the main propulsion performance metrics is how well energy inputted into the system is converted into thrust through a measure known as the impulse coupling coefficient:

$$C_m = \frac{I}{E} \quad (4)$$

where E is the input energy from the laser in Joules. The coupling coefficient was found to rise with higher power levels (FIG. 5 at graph 508), reaching a value of 6.4 μN/W for the maximum laser cutter power level of 20 W. Although nickel has not been specifically studied as an ablation propellant, coupling coefficients between a few microNewtons per Watt and a few tens of microNewtons per Watt have been demonstrated for previously measured metals, consistent with the results found here.

Figure 6:
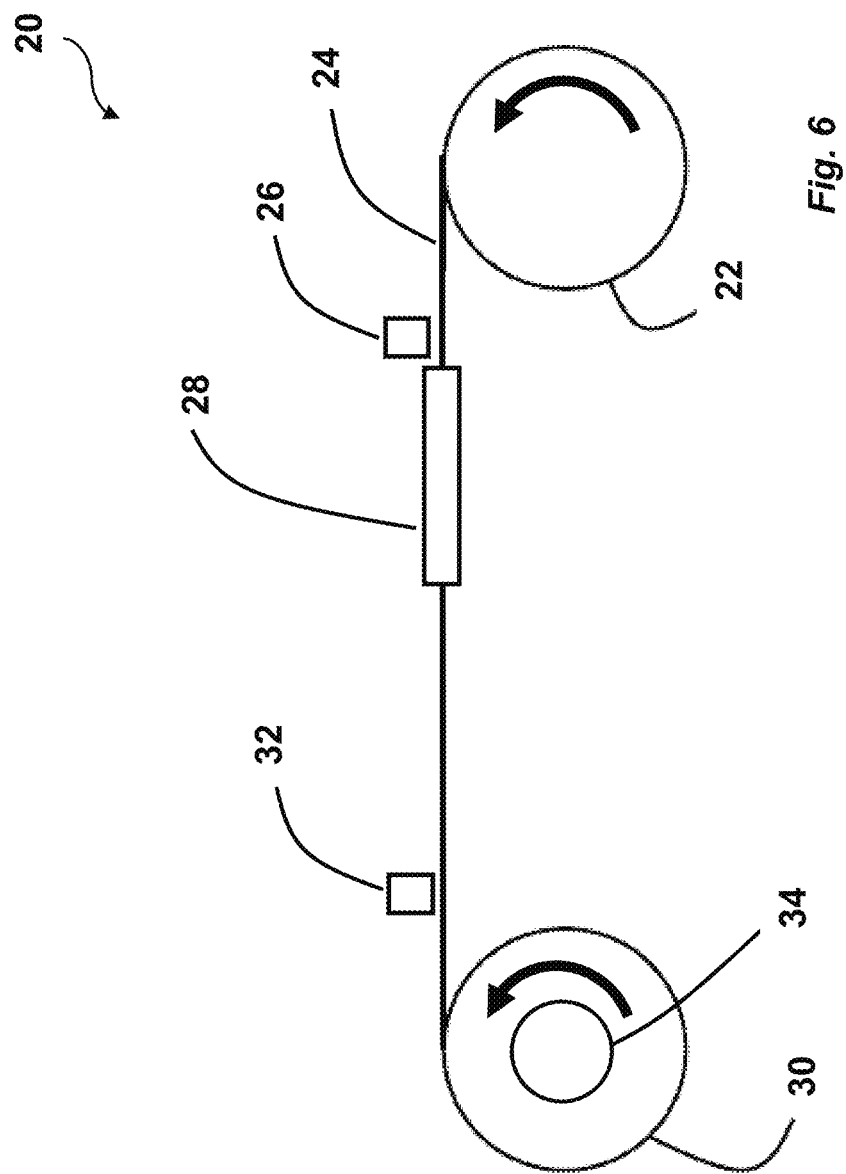
FIG. 6 illustrates an exemplary reel-to-reel device allowing repeated manufacturing of self-folded parts.

FIG. 6 illustrates an exemplary reel-to-reel device 20 allowing repeated manufacturing of self-folded parts as the substrate (sheet stock) is moved from a supply reel to a take-up reel. Reel 22 (supply or play-out reel) supplies substrate 24 to manufacturing position 28. Guide 26 keeps the substrate flat in the manufacturing position. The guide can have a through slot through which the substrate arrives, and slot to both sides. The guide can be of a lubricious polymer such as polytetrafluoroethylene or the line. In embodiments, there is a through slot through which the substrate leaves the manufacturing position. The substrate is taken up by second reel 30 (take-up reel). In the illustration, there is a reel guide 32. Motor 34 pulls the substrate through the manufacturing zone. The motor can be for example various DC or AC motors, such as a brushless DC motor, a high resolution stepper motor, a high resolution servo motor, or the like.

In the manufacturing process the flexible foils are transferred between the two rollers through the guide, which sets the height. In the manufacturing zone the laser (above, not shown) is used to cut and fold 3D components.

A roll-to-roll laser cutter configured for rapidly creating 3D parts is an important new innovation allowing self-folding origami to be done at a large scale.

Figure 7:
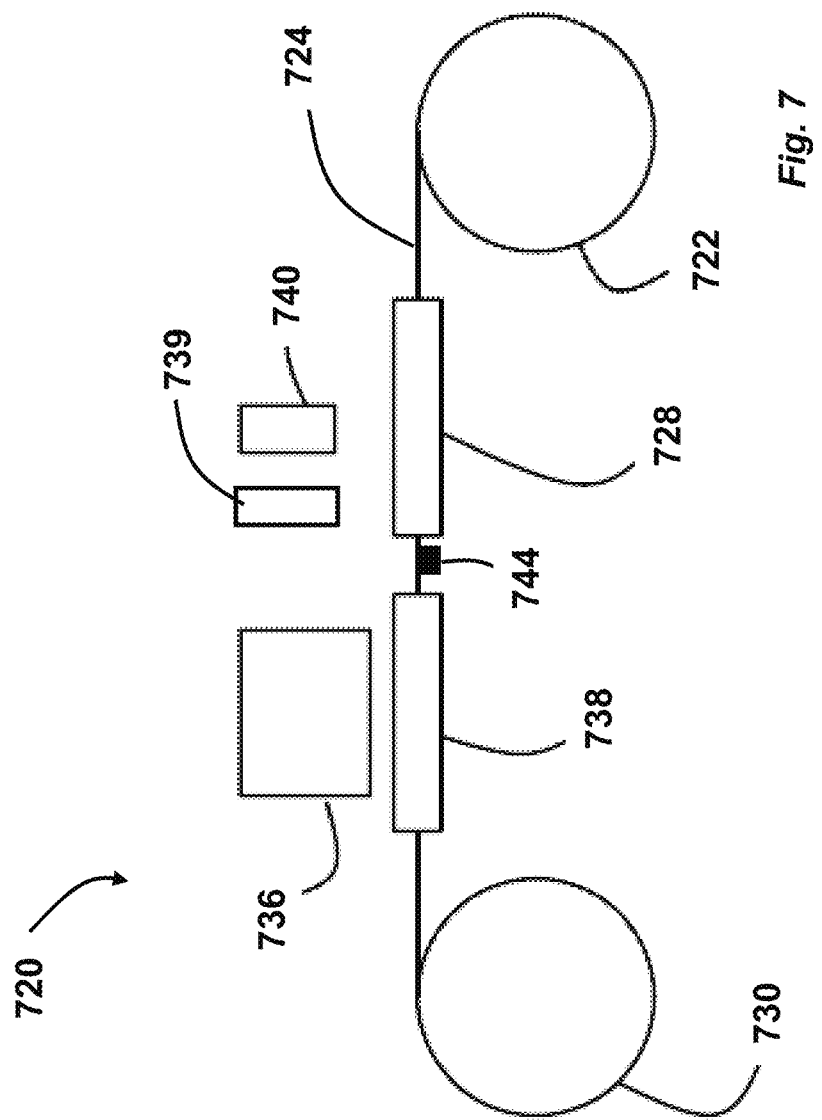
FIG. 7 shows schematically another reel-to-reel device.

FIG. 7 shows schematically another reel-to-reel device 720. The numbering of the reel-to-reel device elements largely matches the numbering in FIG. 6, but advanced by a value of seven hundred. The additional elements are a second manufacturing guide 736, a second manufacturing zone 738, material deposition device (such as a 3D printer head 739), and a laser 740. The manufacturing guides can be such that enough of the top surface of the substrate 724 is unobstructed when the substrate moves from the first manufacturing zone 736 to the second manufacturing zone 738. In embodiments, there is a second motor 744 so that the substrate can be moved between the two manufacturing zones as different elements of the fabrication are effected. With such a device incorporating deposition of additional elements (such as 3D printing), additional elements can be associated by deposition with the construct of the laser-implemented fabrication. A material deposition device can for example add material by welding, gluing or adhering, using a physical attachment device such as a bolt, rivet, or the like, 3D printing, or other deposition/attachment means. Robotic elements and controls can be incorporated into the material deposition device.

Figure 8:
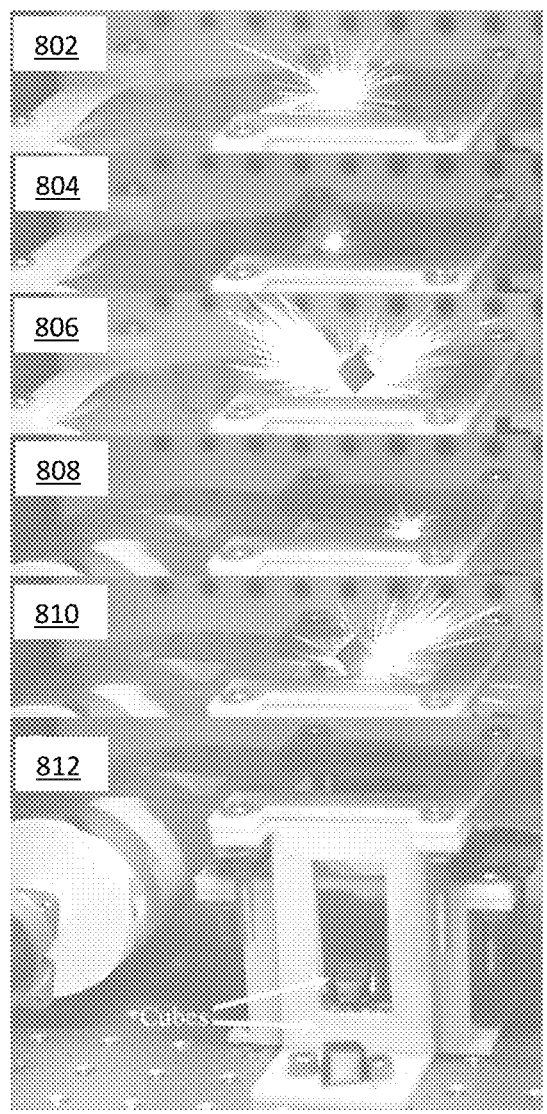
FIG. 8 depicts a series of images of a part assembly system.

FIG. 8 depicts a series of images 802, 804, 806, 808, 810, 812 of a laser forming manufacturing process using the assembly machine 20 of FIG. 6. Using rolls of feedstock allows mass production of self-folded parts using laser cutting and forming. In FIG. 8 at images 802, 804, 806, 808, a cube is cut and folded. At image 810, the laser is used to release the cube. At image 812, the released cube impacts a shoot that allows the cube to exit the front of the assembly machine 20. The substrate will then be moved and the next part assembled.

This innovation provides a powerful new technique for releasing and actuating parts remotely using only a laser cutter, and we believe it has the potential to greatly improve the capability of self-folded systems. As one example application, this could be used to latch a gate closed or open; this possibility is demonstrated in the second latching video, showing us rock our device until it switches to a totally vertical state.

The forgoing embodiment of an actuator comprising two axle holders and a rotor should be considered an example of the types of moving assemblies that the present invention can be used to manufacture and move using laser ablation propulsion. A number of different possible functionalities that become possible with this approach (e.g., latching, switching, assembling, and moving across a build plate), all of which could have general value for a manufacturing process. Multi-element free moving parts are very common in a wide variety of systems that are used every day, and generally require manual assembly through a person or robot arm. Being able perform assembly and cause motion remotely would lower cost and reduce complexity.

Embodiments of the present invention allow individuals to build and assemble parts and other systems on-site and in the field. This technique is intended to allow more complex, multi-part and freely moving parts to be easily created using standard, widely available tools such as laser cutters that could be easily fielded. Latching and moving resulting parts across the build platform are both important new capabilities for these types of systems. Embodiments of the invention may also find use in 4D printing, combining a self-folding and release/propulsion aspects into an additive manufacturing (3D printing) process.

While the foregoing is directed to embodiments of the present invention, other and further embodiments of the invention may be devised without departing from the basic scope thereof, and the scope thereof is determined by the claims that follow.

The invention claimed is:

1. A method of using a laser for forming a part, the method comprising:
   forming the part from a two-dimensional sheet stock using the laser by:
   laser cutting the sheet stock; and
   laser folding by using the laser to heat and bend the cut two-dimensional sheet stock to make the part three dimensional;
   releasing the cut and laser folded 3D part from the sheet stock using the laser; and
   moving the released cut and laser folded 3D part relative to the sheet stock to a position for additional processing or assembly using laser ablation propulsion,
   wherein the cutting, folding, releasing and moving of the part are solely accomplished by the laser.

2. The method of claim 1, wherein, upon releasing the cut and laser folded 3D part from the sheet stock, the part freely falls under its own weight into a position for additional processing or assembly.

3. The method of claim 1, wherein the sheet stock comprises one or more of metal, ceramic, crystalline semiconductors, or glass.

4. The method of claim 3, wherein the metal is nickel, stainless steel, bronze, brass, copper, NiTi shape memory alloy or combinations thereof.

5. The method of claim 1, wherein the two-dimensional sheet stock is positioned between a supply reel and a take-up reel and the method further comprises:
   forming and releasing a first part from the two-dimensional sheet stock using the laser;
   moving the two-dimensional sheet stock from the supply reel to the take-up reel; and
   forming and releasing a second part from the two-dimensional sheet stock using the laser.

6. The method of claim 1, wherein the laser folding comprises localized laser heating to generate plastic stresses for bending at least a portion of the sheet stock.

7. The method of claim 1, wherein the laser cutting comprises: cutting material between the part and the sheet stock to leave just one or more release beams joining the two, and the releasing comprises: cutting the one or more release beams to physically separate the part from the sheet stock.

8. The method of claim 1, wherein the laser ablation propulsion uses the same laser used to laser cut and laser fold the sheet stock.

9. The method of claim 1, further comprising: depositing a material on the part.

10. The method of claim 9, wherein the depositing comprises: welding, gluing, or adhering the material to the part.

11. The method of claim 1, further comprising: applying a fastener to the part.

12. The method of claim 11, wherein the fastener comprises a bolt or a rivet.

13. The method of claim 1, wherein the laser ablation propulsion imparts an impulse force to the part of about 2.6 N.

14. The method of claim 1, wherein the laser ablation propulsion rotates the released cut and laser folded 3D part.

15. Apparatus for forming a part comprising:
   at least one laser configured to direct a laser beam to the sheet stock in the flat area and form laser cuts to the sheet stock, laser fold by using the laser to heat and bend the cut sheet stock so as to make the part three-dimensional, release the cut and laser folded 3D part from the sheet stock, and move the released cut and laser folded 3D part relative to the sheet stock to a position for additional processing or assembly using laser ablation propulsion,
   wherein the cuts, folds, release and moving of the part are solely accomplished by the at least one laser.

16. The apparatus of claim 15, further comprising a 3D printer configured to deposit material on the part.

17. The apparatus of claim 15, further comprising:
   a first reel configured for dispensing a sheet stock;
   a second reel configured for receiving the sheet stock; and
   a guide element for providing a flat area of the sheet stock between the dispensing and receiving reels.

18. The method of claim 1, wherein laser folding comprises: using the laser to execute one or more upward folds via a temperature gradient mechanism of the sheet stock and/or one or more downward folds via a buckling mechanism of the sheet stock.

19. The method of claim 1, wherein sufficient material of the part remains after the laser ablation propulsion to retain its function in use.

* * * * *